United States Patent [19]
Chin et al.

[11] 3,984,154
[45] Oct. 5, 1976

[54] OPTICAL FAN LEVELLING SYSTEM

[76] Inventors: See L. Chin, 3009 Laroche No. 9 Ste. Foy, Quebec, Kenneth A. Mace, 430 Manchester Rd., Kitchener, Ontario, both of Canada

[22] Filed: June 30, 1975

[21] Appl. No.: 591,625

Related U.S. Application Data

[63] Continuation-in-part of Ser. No. 427,323, Dec. 21, 1973, abandoned.

[52] U.S. Cl. .................................. 350/201; 350/199
[51] Int. Cl.² ........................................... G02B 17/00
[58] Field of Search ............ 350/189, 190, 199, 201

[56] References Cited
UNITED STATES PATENTS

| | | |
|---|---|---|
| 2,980,802 | 4/1961 | Bracey et al. ........................ 350/190 |
| 3,259,012 | 7/1966 | Locquin .............................. 350/199 |
| 3,535,023 | 10/1970 | Yamanaka et al. ................. 350/189 |

*Primary Examiner*—David C. Nelms
*Attorney, Agent, or Firm*—Sim & McBurney

[57] ABSTRACT

This invention provides an optical fan system for projecting a planar fan of light against a surface. A source of collimated light is passed into an edge face bridging between two cylindrical concentric reflective surfaces defining outer surfaces of a translucent or transparent body. The light refracts through the edge face, and then is multiply reflected and refracted between the concentric cylindrical surfaces, with total reflection occurring at the internal surface and partial refraction occurring at the outer surface. Suitable silvering or other reflective material is applied to the surfaces in order to accomplish the desired degree of reflectivity.

15 Claims, 5 Drawing Figures

OPTICAL FAN LEVELLING SYSTEM

This application is a continuation-in-part of U.S. application Ser. No. 427,323, entitled "Optical Fan Levelling System," filed Dec. 21st, 1973, now abandoned.

This invention relates generally to optical systems for the production of a planar fan of light. More particularly, this invention is directed to a system in which a planar fan of optical light consisting of closely spaced light beams may be projected against a suitable surface through an angle of up to 360°, such that a guide line will be visible on any object in the way of the light fan.

It is common practice in optical levelling or guide systems such as laser transit systems, to send a beam of collimated light to a specific point at a distance, or to reflect the beam of light into a rotating plane mirror so that the beam is swept across intersecting objects. This rotating system requires an extremely delicate rotating machine, and is difficult to stabilize. Any vibration, random oscillation or other unwanted motion in the rotating mirror (other than the pure rotation) is magnified greatly by projection (on the optical lever principle), and results in inaccuracies in the levels or lines produced by this system.

It is with the foregoing difficulty in mind that the present invention has been developed.

Accordingly, this invention provides an optical fan system for projecting a planar fan of light against a surface, comprising: a source of collimated light, and a reflecting and refracting member of pennannular cross-section, said member having outer and inner concentric cylindrical surfaces, and at least one edge face bridging said surfaces, the surfaces and said edge face being optically smooth, the member being of a material substantially transparent to light from said source, the light from said source being directed to pass through said edge face and obliquely against said inner surface.

The present invention overcomes the difficulties of the conventional system mentioned above, by eliminating motion and obviating the necessity for a rotating mirror. By eliminating movement of any kind, the risk of additional unwanted vibrations and oscillations can be obviated.

One embodiment of this invention is illustrated in the accompanying drawings, in which like numerals denote like parts throughout the several views, and in which.

Figure 1:
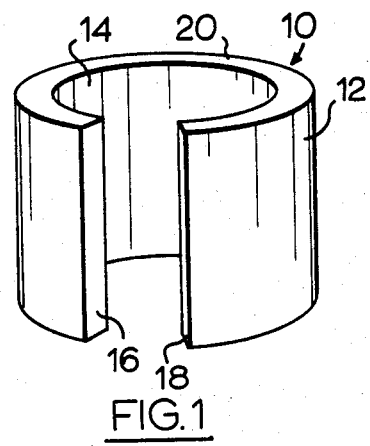
FIG. 1 is a perspective view of a reflecting and refracting member.

Attention is first directed to FIG. 1, which shows a reflecting and refracting member 10 of pennannular cross-section, having an outer cylindrical surface 12, an inner cylindrical surface 14 concentric with the outer cylindrical surface, a first edge face 16 bridging between said surfaces 12 and 14, and a second edge face 18 also bridging between the cylindrical surfaces. The member 10 also includes two end faces 20 (only one end face being visible in FIG. 1). It is important that the cylindrical surfaces 12 and 14 and at least one of the edge faces bridging between the cylindrical surfaces be optically smooth, for reasons which will appear subsequently. The angle between the edge faces 16 and 18 subtended at the common central axis of the two cylindrical surfaces 12 and 14 is approximately 60° in the embodiment shown in the figures, although it will be appreciated from what follows that this angle may be increased or decreased depending upon the "spread" of the optical fan which is desired. The reflecting and refracting member 10 is utilized with a source of collimated light, such as a laser, and it will be understood that it is essential that the member 10 be made of a material which is substantially transparent to the light from the source. Light from a laser light source is usually of a single wavelength (a quality defined as frequency coherence), and the wave-fronts are "in step" (a quality defined as special coherence). The advantage of utilizing a laser as the light source for the present invention does not relate to the fact that the light is coherent, but rather to the fact that it is collimated (i.e. parallel) to an extremely high degree as a natural result of the way in which the laser produces the light. The fact that the laser light is of a single wavelength (ordinarily) may be of some slight advantage in terms of selecting a material which is preferentially transparent to that light, and also to selecting the material for the reflective layers, subsequently to be discussed.

Figure 2:
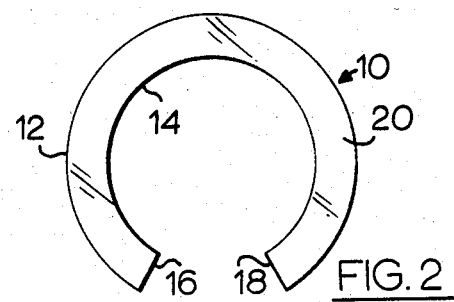
FIG. 2 is a plan view of the member of FIG. 1.
Figure 3:
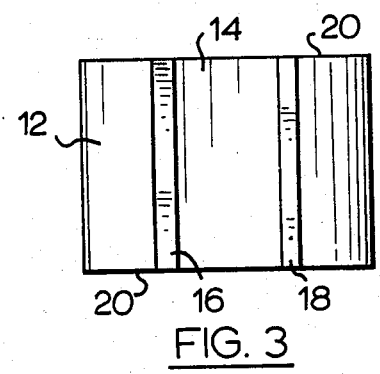
FIG. 3 is an elevational view of the member of FIG. 1.
Figure 4:
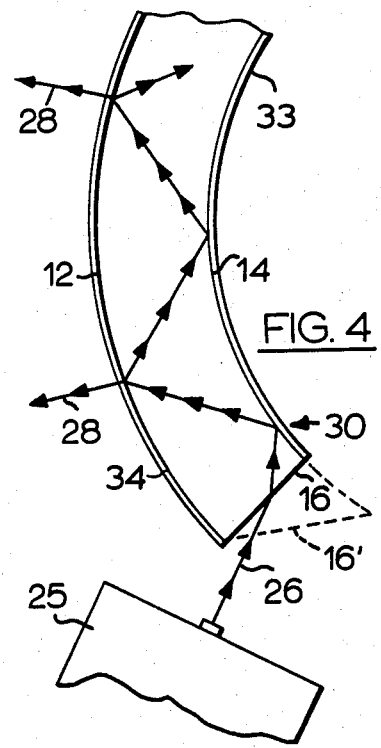
FIG. 4 is a partial sectional view of the member of FIG. 1, to a larger scale.
Figure 5:
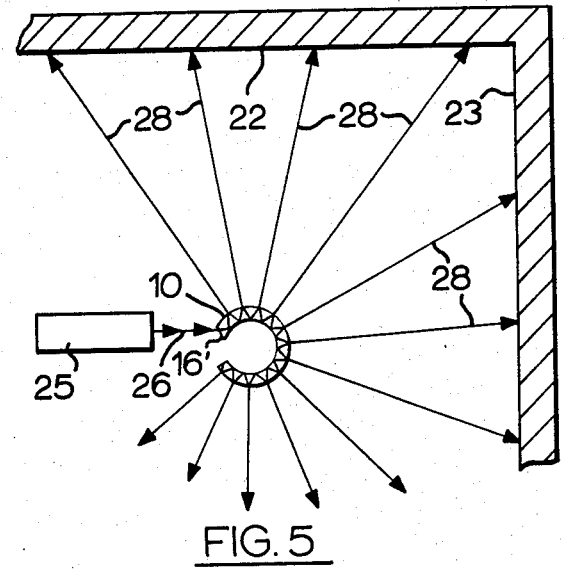
FIG. 5 is a plan view of an optical fan system including the member of FIG. 1, to a smaller scale.

The reflecting and refracting member 10 shown in FIGS. 1, 2 and 3 is utilized with a laser in the general arrangement illustrated in FIG. 5, to which attention is now directed. In FIG. 5 there are shown two walls 22, 23 of a room against which it is assumed to be desired to project a planar fan of light. To accomplish this, the member 10 of FIGS. 1 - 3 is positioned as shown, spaced from both walls 22 and 23, and secured in a rigid, immobile position with its central axis (the common axis of the two cylindrical surfaces 12 and 14) perfectly vertical. A laser 25 is then utilized to project a beam 26 of collimated laser light obliquely against and through the edge face 16. FIG. 4 shows the way in which the beam 26 is refracted through the surface 16, and falls obliquely against the inner cylindrical surface 14.

As can be seen in FIGS. 4 and 5, the intended path for the collimated beam 26 of light within the body of the member 10 between the cylindrical surfaces 12 and 14 is that of a back-and-forth reflection alternately at the surfaces 12 and 14, as the light progresses around the member. It is intended that there be always substantially complete internal reflection at the inner cylindrical surface 14, and partial internal reflection at the outer cylindrical surface 12. By arranging for only partial internal reflection at the outer cylindrical surface 12, a portion of the beam incident from within upon the outer cylindrical surface 12 will be allowed to pass through, and will be refracted as shown by the numeral 28 in FIG. 4. A plurality of these refracted outwardly projecting rays 28 is shown in FIG. 5, and these strike the walls 22 and 23 along a parallel locus. In the drawings, the angular separation between the individual refracted rays 28 in FIGS. 4 and 5 has been exaggerated for clarity of illustration. It will be appreciated that, by altering the angle of incidence of the beam 26 against the inner cylindrical surface at the location 30, (in particular by making the angle "steeper" or closer to perpendicular), the angular separation between the plurality of refracted rays 28 can be greatly decreased, and a larger number of refracted rays 28 can be projected through a given angle. In order easily to permit the angle of incidence of the beam 26, where it strikes the inner cylindrical surface 14 at the location marked by the numeral 30, to be brought closer to perpendicular, a variation of the shape of this particular portion of the member 10 is shown in broken lines in FIG. 4. The numeral 16' identifies an oblique or sloping edge face which may be utilized instead of the normal or radial edge face 16 which is shown in solid lines. The oblique edge face 16' (i.e. oblique to the radial direction passing through the common central axis of the cylindrical surfaces 12 and 14) is such as to "face away" from the central axis of the member 10. FIG. 5 shows the edge face 16' in solid lines.

It will be appreciated that, whenever a beam of light falls against the outer surface of a transparent body from within the body, the phenomenon of internal reflection takes places. This is what is illustrated at the numeral 30 in FIG. 4. If the angle of incidence (the angle to the perpendicular to the surface) is greater than the critical angle, then total internal reflection will take place regardless of whether the surface is silvered, aluminized, or otherwise made to be reflective. If the angle of incidence is less than the critical angle, then a portion of the beam will be internally reflected, and the remainder of the light will pass through the interface and be refracted away from the surface into the surrounding medium. We are here discussing the situation where an interface separates a first medium of higher index of refraction from a second medium of lower index of refraction, the light beam hitting the interface from the medium with the higher index of refraction.

As can be seen from FIG. 4, when the light beam is made to reflect back and forth between the two cylindrical surfaces 12 and 14 in the manner shown, the angle of incidence against the inner cylindrical surface 14 will always be slightly greater than the angle of incidence against the outer cylindrical surface 12. For this reason, it is theoretically possible to select the angles in such a way that the incident angle against the inner cylindrical surface 14 will be greater than the critical angle (thus giving rise to total internal reflection), and the incident angle against the outer cylindrical surface 12 will be smaller than the critical angle, thus giving rise to partial internal reflection and partial refraction through the interface. There is only a very small range over which such angles could be selected, and this would mean that the angular separation between the refracted rays 28 (FIG. 5) could not be varied at will to any great degree.

In order to achieve total internal reflection at the inner cylindrical surface 14 regardless of the angle of incidence, the preferred embodiment of the number 10 has its inner cylindrical surface 14 coated with a layer 33 of reflective material such that the interface between the layer 33 and the member is substantially fully reflective to light from the source (a laser in the embodiment illustrated), such that total internal reflection at the inner surface is ensured regardless of the angle of incidence.

Also in the preferred embodiment, the outer cylindrical surface 12 is likewise coated with a further layer 34 of reflective material, but here the characteristics of the layer 34 are such as to cause only partial internal reflection of incident light coming from within the member 10, and to permit a portion of such incident light to pass out of the member as a refracted ray into the surrounding medium. This characteristic can be arranged by adjusting the thickness of the layer 34, by carefully selecting the material comprising the layer 34, or both. The reflective material in either layer 33 or 34 may conveniently be selected from the group: silver, aluminum, chromium, and alloys thereof.

In accordance with a preferred embodiment of this invention the characteristics of the further layer 34 are such that the proportion of incident light (from within) which is internally reflected at the outer cylindrical surface 12 decreases around the member 10 in the direction away from the edge face 16 (16'). This can be accomplished, for example, by causing the thickness of the layer 34 to decrease around the member in the direction away from the edge face 16 (16'), and this will progressively decrease the proportion of incident light which is internally reflected at the outer surface 12.

It will be understood that the "fan" comprising the individual refracted rays 28 projecting outwardly from the member 10 will have a thickness which is the same as that of the original beam of light coming from the source, which in this case is a laser 25. This thickness is ordinarily on the order of a few millimeters. As mentioned previously, when the axis through the center of the member 10 is perfectly vertical, the optical fan will be in a horizontal optical plane. By rotation the cylinder about the initial beam 26 of the laser, the fan of light comprising the individual refracted rays 28 can be projected outward at any desired angle from horizontal to vertical.

What we claim is:

1. An optical fan system for projecting a planar fan of light against a surface comprising:
    a source of collimated light,
    and a reflecting and refracting member of pennannular cross-section, said member having outer and inner concentric cylindrical surfaces, and at least one edge face bridging said surfaces, the surfaces and said edge face being optically smooth, the member being of a material substantially transparent to light from said source, the light from said source being directed to pass through said edge face and obliquely against said inner surface.

2. The invention claimed in claim 1, in which substantially total internal reflection takes place at said inner surface.

3. The invention claimed in claim 2, in which the internal reflection arises at least in part due to the angle of incidence of the light against said inner surface.

4. The invention claimed in claim 2, wherein the inner surface is coated with a layer of reflective material such that the interface between said layer and said member is substantially fully reflective to light from said source, whereby to ensure said total internal reflection at said inner surface.

5. The invention claimed in claim 4, in which the outer surface is coated with a further layer of reflective material, the characteristics of said further layer being such as to cause partial internal reflection of incident light and to permit a portion of such incident light to pass out of the member.

6. The invention claimed in claim 5, in which said further layer is such that the proportion of incident light which is internally reflected at said outer surface decreases around the member in the direction away from said edge face.

7. The invention claimed in claim 5, in which the reflective material in both said layer is selected from the group: silver, aluminum, chromium, alloys thereof;

an in which the thickness of said further layer decreases around the member in the direction away from said edge face, thereby to progressively decrease the proportion of incident light which is internally reflected at said outer surface.

8. The invention claimed in claim 1, in which said edge face is substantially normal to said cylindrical surfaces.

9. The invention claimed in claim 1, in which said edge face is oblique to both said cylindrical surfaces and faces away from the center of curvature of said surfaces.

10. The invention claimed in claim 5, in which said edge face is substantially normal to said cylindrical surfaces.

11. The invention claimed in claim 5, in which said edge face is oblique to both said cylindrical surfaces and faces away from the center of curvature of said surfaces.

12. The invention claimed in claim 5, in which said source is a laser.

13. A method of projecting a planar fan of light against a surface, comprising the steps:
providing a source of collimated light,
providing a reflecting and refracting member of pen-nannular cross-section, having outer and inner concentric cylindrical surfaces, and at least one edge face bridging said surfaces, the surfaces and the edge face being optically smooth, the member being of a material transparent to light from said source,
passing collimated light from said source through said edge face and obliquely against said inner surface,
internal reflecting said light from said inner surface toward said outer surface,
partially internally reflecting said light from said outer surface, whereby some of said light passes out of the member,
and multiply internally reflecting said light between said surfaces while allowing part of the light to pass out of said member at each location of incidence against said outer surface.

14. For use with a source of collimated light to project a planar fan of light against a surface,
a reflecting and refracting element of uniform pen-nannular cross-section, the element including an outer cylindrical surface, an inner cylindrical surface concentric with the outer one, and at least one edge face; the element being of a material substantially transparent to the light from said source; the cylindrical surfaces and said edge face being optically smooth, the inner surfaces being coated with a first layer of reflective material such that the interface between said first layer and said inner surface is substantially fully reflective to light from said source; the outer surface being coated with a second layer of reflective material such that the interface between said second layer and said outer surface is partly reflective to light from said source but permits a portion of incident light to pass.

15. The invention claimed in claim 14, in which the degree of internal reflectivity of said outer surface decreases around the element in the direction away from said edge face.

* * * * *